United States Patent
Ito et al.

(10) Patent No.: US 10,843,957 B2
(45) Date of Patent: Nov. 24, 2020

(54) GLASS PLATE AND MANUFACTURING METHOD OF GLASS PLATE

(71) Applicant: AGC Inc., Chiyoda-ku (JP)

(72) Inventors: Jun Ito, Tokyo (JP); Ikuo Nagasawa, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/538,901

(22) Filed: Aug. 13, 2019

(65) Prior Publication Data

US 2019/0359514 A1   Nov. 28, 2019

Related U.S. Application Data

(63) Continuation of application No. PCT/JP2018/002938, filed on Jan. 30, 2018.

(30) Foreign Application Priority Data

Feb. 21, 2017   (JP) ................. 2017-030505

(51) Int. Cl.
   *B32B 3/26*        (2006.01)
   *C03B 33/02*       (2006.01)
   (Continued)

(52) U.S. Cl.
   CPC ........ *C03B 33/0222* (2013.01); *B23K 26/364* (2015.10); *C03C 21/002* (2013.01);
   (Continued)

(58) Field of Classification Search
   CPC . Y10T 428/15; C03B 33/0222; B23K 26/364; B32B 3/26
   See application file for complete search history.

(56) References Cited

U.S. PATENT DOCUMENTS

2004/0144231 A1   7/2004   Hanada et al.
2006/0246302 A1   11/2006  Brady et al.
(Continued)

FOREIGN PATENT DOCUMENTS

JP   2004-217492 A   8/2004
JP   2009-539743 A   11/2009
(Continued)

OTHER PUBLICATIONS

Written Opinion dated Mar. 6, 2018 in PCT/JP2018/002938 filed Jan. 30, 2018.
(Continued)

*Primary Examiner* — Alexander S Thomas
(74) *Attorney, Agent, or Firm* — Oblon, McClelland, Maier & Neustadt, L.L.P.

(57) ABSTRACT

Separation lines are formed in a glass plate having first and second main surfaces by irradiating with laser light. The separation lines are configured of a product line corresponding to an outline of a glass article to be separated from the glass plate; and a release line. The product line includes a first in-plane void array configured of in-plane voids arranged on the first main surface. A maximum distance between centers of the adjacent in-plane voids arranged on the first main surface falls within a range of 1 μm to 10 μm. The release line includes internal void arrays for release line, which are arranged along lines connecting the first and second main surfaces, respectively. A maximum distance between centers of the adjacent points, at which extension lines extended from the internal void arrays for release line cross the first main surface, is greater than 10 μm.

16 Claims, 8 Drawing Sheets

(51) Int. Cl.
  *B23K 26/364* (2014.01)
  *C03C 21/00* (2006.01)
  *B23K 103/00* (2006.01)
(52) U.S. Cl.
  CPC ............ *B23K 2103/54* (2018.08); *B32B 3/26* (2013.01); *Y10T 428/15* (2015.01)

(56) References Cited

U.S. PATENT DOCUMENTS

| | | |
|---|---|---|
| 2012/0047957 A1 | 3/2012 | Dannoux et al. |
| 2012/0135847 A1 | 5/2012 | Fukasawa et al. |
| 2012/0196071 A1 | 8/2012 | Cornejo et al. |
| 2013/0068505 A1 | 3/2013 | Hong et al. |
| 2013/0126573 A1 | 5/2013 | Hosseini et al. |
| 2014/0083983 A1 | 3/2014 | Zhang et al. |
| 2014/0147624 A1 | 5/2014 | Streltsov et al. |
| 2014/0151370 A1 | 6/2014 | Chang et al. |
| 2015/0165548 A1 | 6/2015 | Marjanovic et al. |
| 2015/0166393 A1 | 6/2015 | Marjanovic et al. |
| 2015/0235869 A1 | 8/2015 | Uehara |
| 2016/0009586 A1 | 1/2016 | Bookbinder et al. |
| 2016/0059359 A1 | 3/2016 | Krueger et al. |
| 2016/0060156 A1 | 3/2016 | Krueger et al. |
| 2016/0200621 A1 | 7/2016 | N'Gom et al. |
| 2016/0318796 A1 | 11/2016 | Masuda |
| 2017/0174565 A1 | 6/2017 | Kase et al. |
| 2017/0197868 A1 | 7/2017 | Gupta et al. |
| 2018/0186677 A1 | 7/2018 | Ito et al. |

FOREIGN PATENT DOCUMENTS

| | | |
|---|---|---|
| JP | 2012-526721 A | 11/2012 |
| JP | 2013-536081 A | 9/2013 |
| JP | 2014-65624 A | 4/2014 |
| JP | 2014-531391 A | 11/2014 |
| JP | 2015-156427 A | 8/2015 |
| JP | 2016-506351 A | 3/2016 |
| TW | 201433554 A | 9/2014 |
| WO | WO 2009/084398 A1 | 7/2009 |
| WO | WO 2011/002089 A1 | 1/2011 |
| WO | WO 2011/037167 A1 | 3/2011 |
| WO | WO 2014/161535 A2 | 10/2014 |
| WO | WO 2015/079849 A1 | 6/2015 |
| WO | WO 2015/080043 A1 | 6/2015 |
| WO | WO 2015/113024 A1 | 7/2015 |
| WO | WO 2015/113026 A2 | 7/2015 |
| WO | WO 2017/038853 A1 | 3/2017 |

OTHER PUBLICATIONS

International Search Report dated Mar. 6, 2018 in PCT/JP2018/002938 (with English translation), 4 pages.
International Search Report (with English translation) and Written Opinion dated Mar. 6, 2018 in PCT/JP2018/002937, 7 pages.
International Search Report (with English translation) and Written Opinion dated Oct. 31, 2017, in PCT/JP2017/028070 translation), 8 pages.
International Search Report (with English translation) and Written Opinion dated Dec. 6, 2016, in PCT/JP2016/075475, 7 pages.
International Search Report (with English translation) and Written Opinion dated Oct. 11, 2016, in PCT/JP2016/075415, 7 pages.
Office Action dated Sep. 19, 2019, in co-pending U.S. Appl. No. 15/909,291, 12 pages.
Restriction requirement dated May 21, 2019, in co-pending U.S. Appl. No. 15/909,291, 7 pages.

GLASS PLATE AND MANUFACTURING METHOD OF GLASS PLATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/002938 filed on Jan. 30, 2018 and designating the U.S., which claims priority of Japanese Patent Application No. 2017-030505 filed on Feb. 21, 2017. The entire contents of the foregoing applications are incorporated herein by reference.

BACKGROUND OF THE INVENTION

1. Field of the Invention

The disclosure herein generally relates to a glass plate and a manufacturing method of a glass plate.

2. Description of the Related Art

Techniques for irradiating large-sized glass plates with laser light to form separation lines on the glass plates have been known in order to separate a plurality of pieces of glass from the glass plates, to obtain glass articles (e.g. glass products) (See, for example, U.S. Patent Application Publication No. 2015/0166393). In the technique, by irradiating the glass plate with laser light, separation lines are formed corresponding to a final shape of the glass articles. Then, the glass plate is cut along the separation lines, and thereby glass articles having desired shapes are obtained.

SUMMARY OF THE INVENTION

Technical Problem

The inventors of the present application found that the above-described glass plate, on which the separation lines are formed for separation, may be sometimes divided into pieces against an intention, before the predetermined separation step (in the following, referred to as a "pre-separation").

When the pre-separation occurs, there is a problem that the subsequent handling of the glass plate may become complicated, and a quality of glass articles may be degraded due to scratches or cracks on end faces of the glass articles.

The present invention was made in view of such a problem, and it is an object of the present invention to provide a glass plate, in which the pre-separation is less likely to occur. Moreover, it is an object of the present invention also to provide a manufacturing method of a glass plate, in which the pre-separation is less likely to occur.

Solution to Problem

The present invention provides a glass plate having a first main surface and a second main surface opposite each other, a plurality of separation lines being formed in the glass plate and on the first main surface by irradiating the glass plate with laser light, the separation lines being configured of at least one product line and at least one release line; the product line corresponding to an outline of a glass article to be separated and extracted from the glass plate; and the release line being a part of the separation lines other than the product line, the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line, a maximum distance $P_{1max}$ between centers of the in-plane voids adjacent to each other arranged on the first main surface falling within a range of 1 µm to 10 µm, the release line including a plurality of internal void arrays for release line, each of the internal void arrays for release line being arranged along a line connecting the first main surface and the second main surface; and the internal void array for release line being configured of a plurality of internal voids for release line, and a maximum distance $P_{2max}$ between centers of virtual in-plane voids adjacent to each other being greater than 10 µm, the virtual in-plane void being defined to be a position at which an extension line extended from the internal void array for release line crosses the first main surface, or a void in the internal void array for release line on the first main surface when the void is located on the first main surface.

Moreover, the present invention also provides a manufacturing method of a glass plate including preparing a glass material having a first main surface and a second main surface opposite each other; and irradiating the glass material with laser light to form separation lines, the separation lines being configured of at least one product line and at least one release line; the product line corresponding to an outline of a glass article to be separated and extracted from the glass material; and the release line being a part of the separation lines other than the product line, the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line, a maximum distance $P_{1max}$ between centers of the in-plane voids adjacent to each other arranged on the first main surface falling within a range of 1 µm to 10 µm, the release line including a plurality of internal void arrays for release line, each of the internal void arrays for release line being arranged along a line connecting the first main surface and the second main surface; and the internal void array for release line being configured of a plurality of internal voids for release line, and a maximum distance $P_{2max}$ between centers of virtual in-plane voids adjacent to each other being greater than 10 µm, the virtual in-plane void being defined to be a position at which an extension line extended from the internal void array for release line crosses the first main surface, or a void in the internal void array for release line on the first main surface when the void is located on the first main surface.

In the manufacturing method, the glass material in the step (1) may be a glass material manufactured by a person who implements the above-described manufacturing method, or may be a glass material purchased from a third party.

Effect of Invention

According to an aspect of the present invention, a glass plate in which a pre-separation is less likely to occur is provided. Moreover, according to another aspect of the present invention, a manufacturing method of a glass plate, in which the pre-separation is less likely to occur, is also provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, embodiments for implementing the present invention will be described with reference to the accompanying drawings.

(Glass Plate in the Related Art)

In order to understand a configuration and a feature of the present invention, a glass plate in the related art will be briefly described with reference to FIG. 1.

Figure 1:
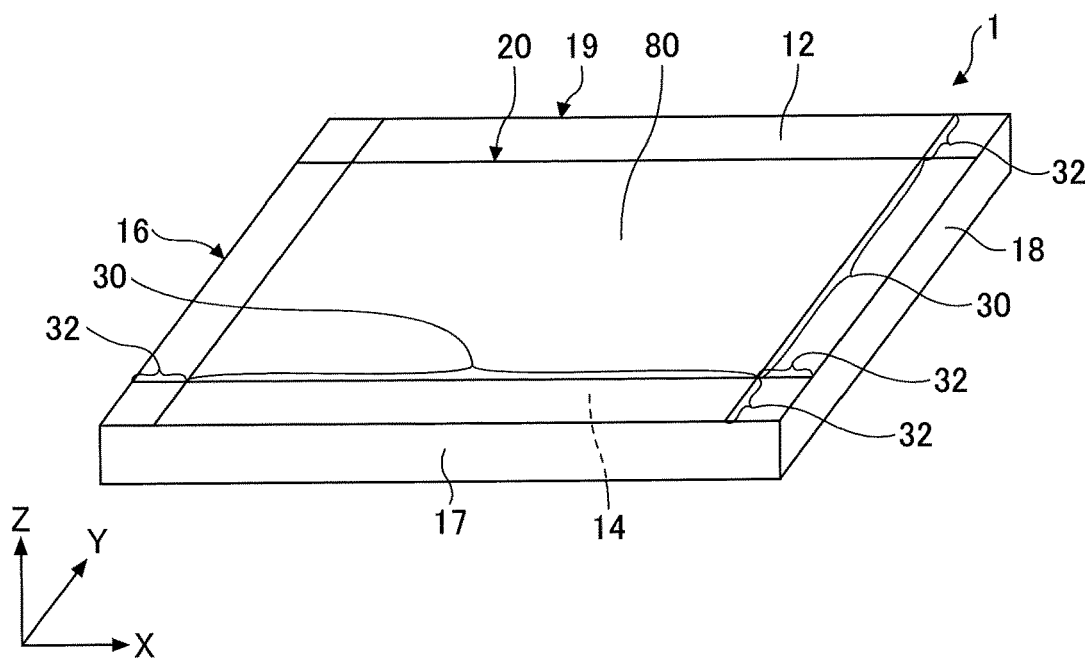
FIG. 1 is a perspective view schematically depicting a glass plate in the related art.

FIG. 1 is a perspective view schematically depicting the glass plate 1 in the related art.

As illustrated in FIG. 1, the glass plate 1 in the related art includes a first main surface 12 and a second main surface 14. The second main surface 14 is not viewable in FIG. 1. Moreover, the glass plate 1 in the related art has four end faces each connecting the first main surface 12 and the second main surface 14. In the following, the four end faces will be referred to as, in the counter clockwise direction, a first end face 16, a second end face 17, a third end face 18, and a fourth end face 19.

The glass plate 1 in the related art has two separation lines 20 extending in the long side direction of the glass plate 1 (X-axis direction) from the first end face 16 to the third end face 18 on the first main surface 12. Moreover the glass plate in the related art has two separation lines 20 extending in the short side direction of the glass plate 1 (Y-axis direction) from the second end face 17 to the fourth end face 19 on the first main surface 12.

The above-described separation lines 20 extending in the X-axis direction and in the Y-axis direction are formed by irradiating with laser light.

In the following, a structure of the separation line 20 will be described in detail with reference to FIG. 2.

Figure 2:
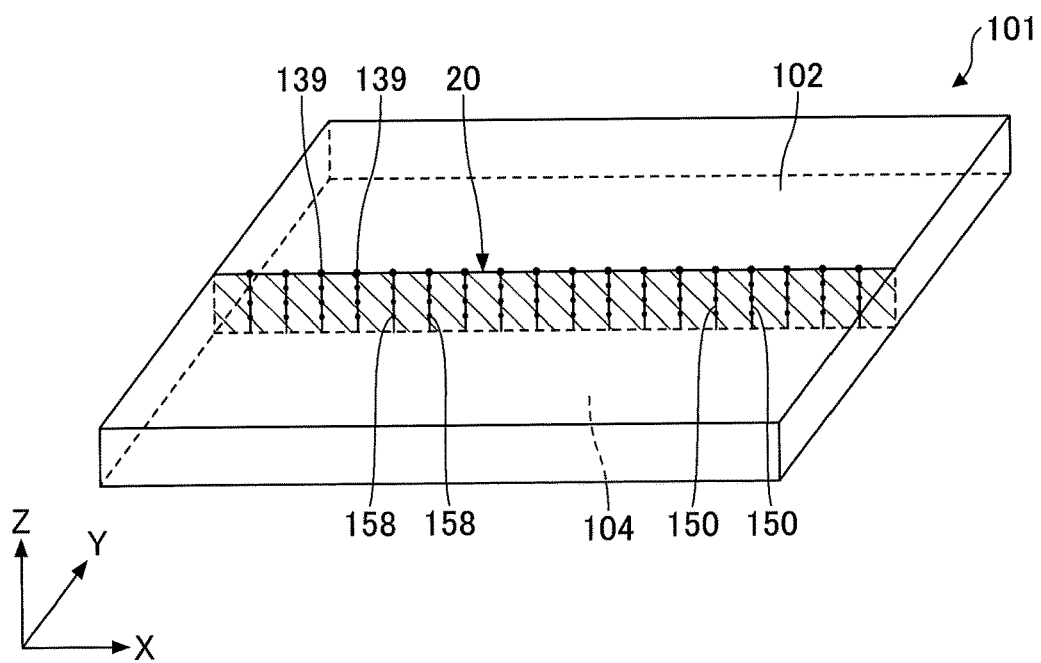
FIG. 2 is a diagram schematically depicting an example of a configuration of a separation line in the glass plate in the related art.

FIG. 2 is a diagram schematically depicting an example of a configuration of the separation line 20.

FIG. 2 shows that the separation line 20 is formed on a first main surface 102 of a glass material 101 and extends in the long side direction (X-axis direction).

The separation line 20 includes a plurality of in-plane voids 139 that are arranged in a predetermined array on the first main surface 102.

In the following, such an array of the in-plane voids 139 on the main surface, which may be any of the first main surface 102 and a second main surface 104, will be particularly referred to as an "in-plane void array".

Moreover, the separation line 20 has a plurality of "internal void arrays" 150 that extend in a plate thickness direction (Z-axis direction) from the first main surface 102 to the second main surface 104 of the glass material 101. Each of the internal void arrays 150 includes a plurality of internal voids 158 that are arranged in the plate thickness direction (Z-axis direction) from the first main surface 102. Each internal void array 150 has a corresponding in-plane void 139. Thus, each internal void array 150 extends below a corresponding in-plane void 139.

The above-described separation line 20 illustrated in FIG. 1 is formed so as to separate a glass article 80 from the glass plate 1 in the related art in the next operation. The separation line 20 foil's an outline of the glass article 80 which will be separated in the next step.

The separation line 20 extending in the X-axis direction includes a part 30 corresponding to the outline of the glass article 80 extending in the X-axis direction (in the following, referred to as a "product line in the X-axis direction"); and release lines 32 extending in the X-axis direction. Similarly, the separation line 20 extending in the Y-axis direction includes a part 30 corresponding to the outline of the glass article 80 extending in the Y-axis direction (in the following, referred to as a "product line in the Y-axis direction"); and release lines 32 extending in the Y-axis direction.

In other words, the separation line 20 in the X-axis direction includes the product line in the X-axis direction 30 and the release lines 32 in the X-axis direction located on both ends of the product line in the X-axis direction 30. Similarly, the separation line 20 in the Y-axis direction includes the product line in the Y-axis direction 30 and the release lines 32 in the Y-axis direction located on both ends of the product line in the Y-axis direction 30.

The release lines 32 are arranged so as to facilitate easy separation of the glass article 80 from the glass plate 1 in the related art.

If the glass plate 1 in the related art is not provided with the release lines 32, a glass article 80 is separated from the glass plate 1 in the related art through a "cutout process". When the glass plate 1 in the related art is thick, in the process of separating the glass article 80 from the glass plate 1 in the related art in the plate thickness direction, a cut surface of the glass article 80 is easily caught by a cut surface of the glass plate 1, and thereby the separation process may be less likely to progress.

When the glass plate 1 in the related art is provided with the release lines 32, a glass article 80 is separated from the glass plate 1 in the related art through a "non-cutout process". Thus, the glass article 80 is easily separated from the glass plate 1 in the related art.

The inventors of the present application found that the glass plate 1 in the related art may be sometimes divided into a plurality of pieces before the predetermined separation step, and that in more severe cases the glass article 80 may be separated from the glass plate 1 during the handling of the glass plate 1 (in the following, referred to as a "pre-separation").

The pre-separation is likely to occur when a stress is applied to the glass plate 1 in the related art. For example, for the glass plate 1 in the related art, before the separation process of the glass article 80, various processes such as a conveyance process, a chemical tempering process, a deposition process and a washing process, may be performed. The pre-separation is likely to occur according to a heat load, a load of the own weight, or an influence of vibration or the like.

When the pre-separation occurs, there is a problem that the subsequent handling of the glass plate 1 may become complicated, and a quality of glass article 80 may be degraded due to scratches or cracks on end faces of the glass article 80.

In particular, the glass plate 1 in the related art has been originally used in order to solve the problem that the handling of a plurality of small glass articles 80 is complicated. However, when pre-separation occurs, the ability to leverage such a solution to the problem becomes lost.

(Glass Plate According to Embodiment of Present Invention)

Next, an example of a configuration of a glass plate according to an embodiment of the present invention will be described with reference to FIG. 3.

Figure 3:
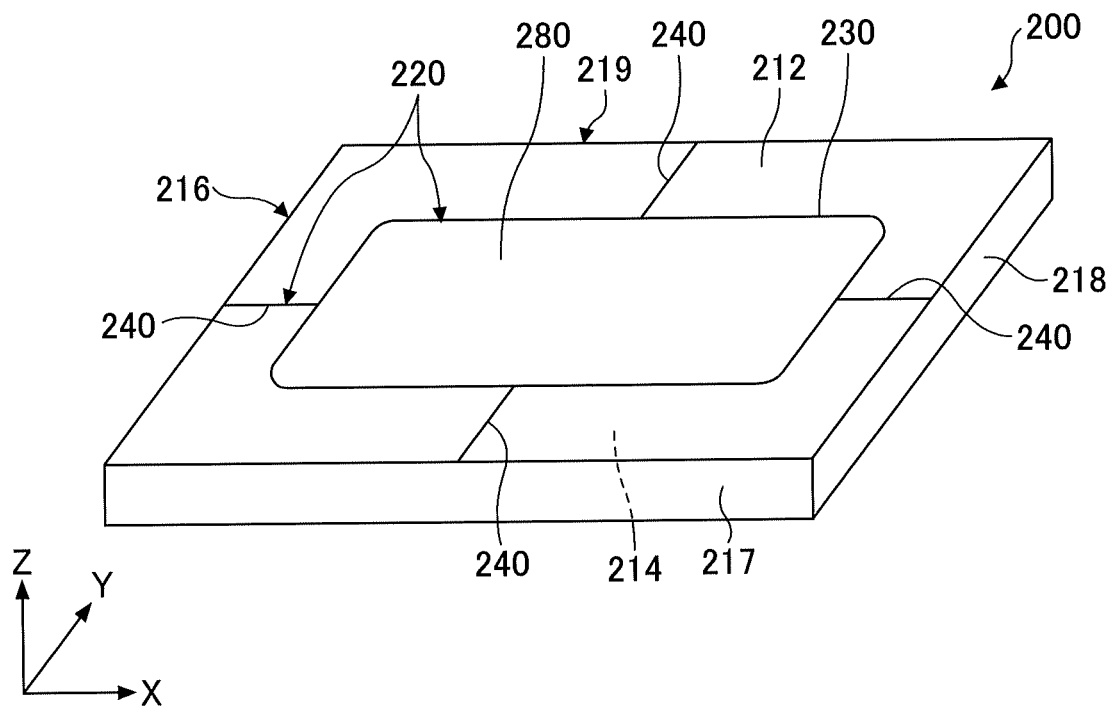
FIG. 3 is a perspective view schematically depicting an example of a glass plate according to an embodiment.

FIG. 3 is a perspective view schematically depicting a glass plate according to the embodiment of the present invention (in the following, referred to as a "first glass plate").

The first glass plate 200 illustrated in FIG. 3 includes a first main surface 212 and a second main surface 214 that face each other. However, the second main surface 214 is not viewable in FIG. 3. Moreover, the first glass plate 200 has four end faces connecting the first main surface 212 and the second main surface 214. In the following, the four end faces will be referred to as, in the counter clockwise direction, a first end face 216, a second end face 217, a third end face 218 and a fourth end face 219.

The first glass plate 200 has a rectangular shape in the top plan view. Thus, the first end face 216 and the third end face 218 face each other, and the second end face 217 and the fourth end face 219 face each other.

The first glass plate 200 has a plurality of separation lines 220 on the first main surface 212. The separation line 220 includes a product line and a release line, in the same way as in the glass plate 1 in the related art.

For example, FIG. 3 shows that the separation line 220 includes a product line 230 having a loop shape formed around the center of the first main surface 212; and four release lines 240 each extending in a longitudinal direction (Y-axis direction) or in a lateral direction (X-axis direction) from a point on the product line 230 to the end face.

The product line 230 corresponds to an outline of a glass article 280 which will be separated and extracted from the first glass plate 200 in the subsequent separation process. Thus, from the first glass plate 200 illustrated in FIG. 3, a glass article 280 having an approximately rectangular shape with four round corners is extracted after the separation process.

The separation lines 220 (i.e. the product line 230 and the release lines 240) are formed by irradiating the first glass plate 200 with laser light.

In the following, configurations of the product line 230 and the release line 240 will be described in detail with reference to FIGS. 4 to 7.

Figure 4:
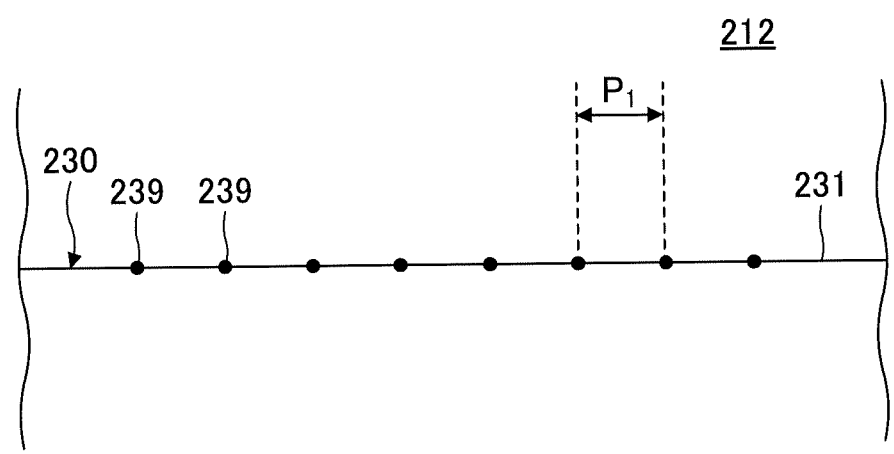
FIG. 4 is a top view schematically depicting an example of a part of a product line according to the embodiment.
Figure 5:
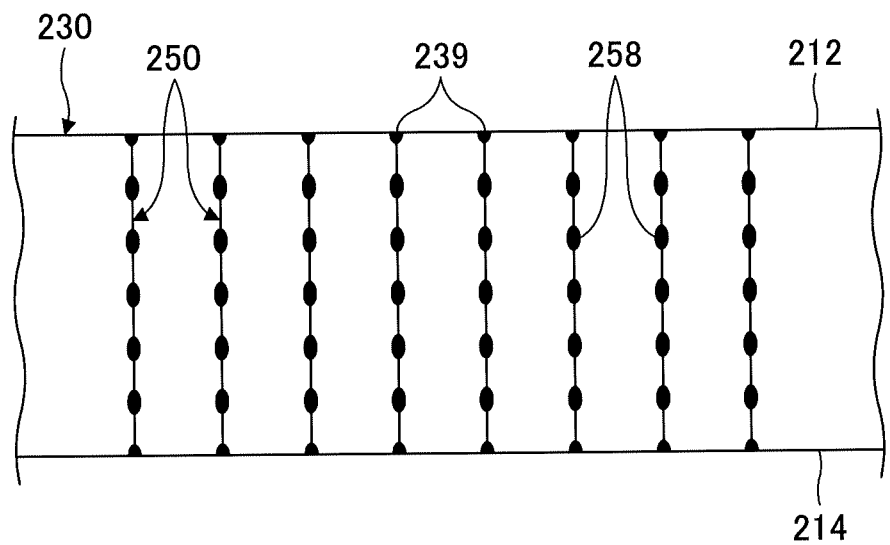
FIG. 5 is a cross-sectional view schematically depicting an example of a part of the product line according to the embodiment.

FIGS. 4 and 5 are diagrams depicting an example of a configuration of the product line 230. FIG. 4 is a plan view schematically depicting a part of the product line 230 formed on the first main surface 212 of the first glass plate 200. FIG. 5 is a cross-sectional view schematically depicting a part of the product line 230 in the first glass plate 200.

Figure 6:
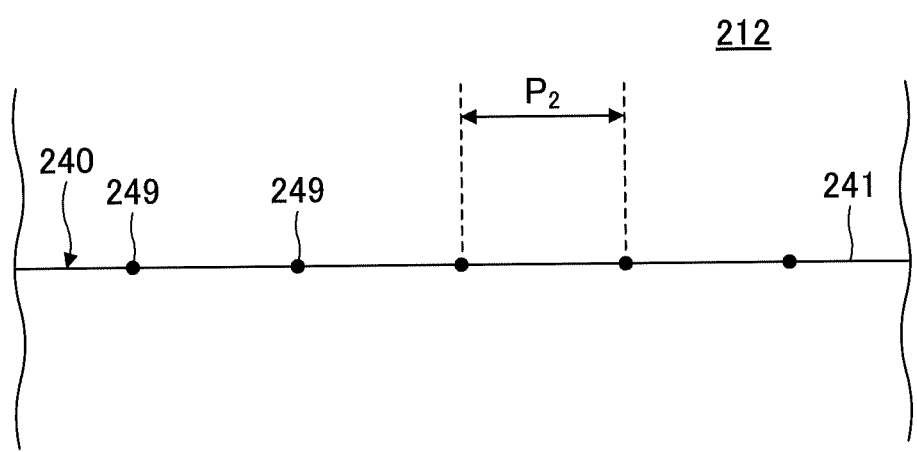
FIG. 6 is a top view schematically depicting an example of a part of a release line according to the embodiment.
Figure 7:
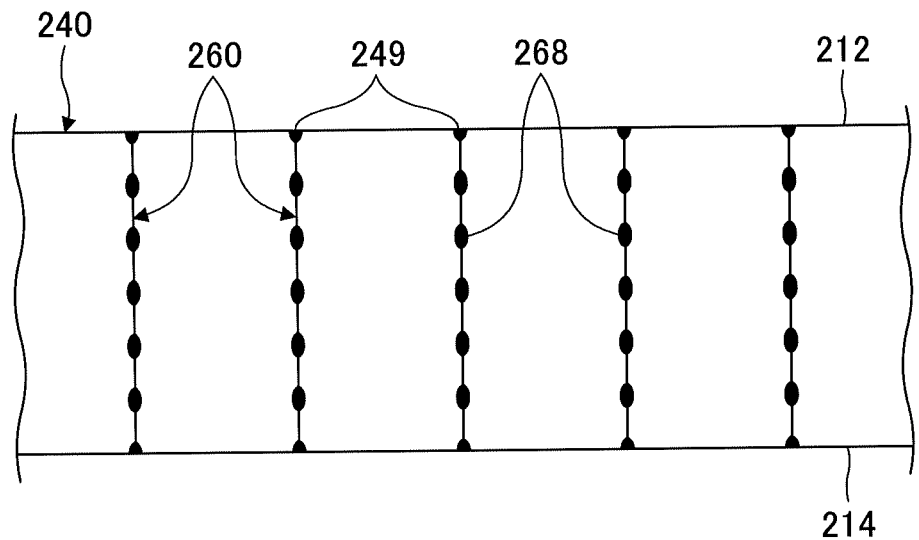
FIG. 7 is a cross-sectional view schematically depicting an example of a part of the release line according to the embodiment.

FIGS. 6 and 7 are diagrams depicting an example of a configuration of the release line 240. FIG. 6 is a plan view schematically depicting a part of the release line 240 formed on the first main surface 212 of the first glass plate 200. FIG. 7 is a cross-sectional view schematically depicting a part of the release line 240 in the first glass plate 200.

FIGS. 4 and 5 show that the product line 230 includes a first in-plane void array 231 on the first main surface 212. The first in-plane void array 231 is configured of a plurality of in-plane voids 239 arranged on the first main surface 212.

Moreover, the product line 230 includes a plurality of internal void arrays 250 (in the following, referred to as "internal void arrays for product line 250"), each extending from the first main surface 212 of the first glass plate 200 to the second main surface 214. Each internal void array for product line 250 has a corresponding in-plane void 239 of the in-plane void array 231. In other words, each internal void array for product line 250 extends below a corresponding in-plane void 239.

In the internal void array for product line 250, a plurality of internal voids 258 (in the following, referred to as "internal voids for product line 258") are arranged. In other words, the plurality of internal voids for product line 258 are arranged in a line, thereby the internal void array for product line 250 is formed.

The extension direction of the internal void array for product line 250 is not limited to the direction orthogonal to the first main surface 212. The internal void array for product line 250 may extend in a direction inclined from the thickness direction of the first glass plate 200.

FIGS. 4 and 5 show that a distance $P_1$ between centers of adjacent in-plane voids 239 (spacing of in-plane voids) in the first in-plane void array 231 in the product line 230 is the same for any of the in-plane voids 239. However, the embodiment is not limited to the above-described configuration, and the distance $P_1$ between centers of the adjacent in-plane voids 239 may vary depending on the in-plane void 239. The distance $P_1$ between centers of the adjacent in-plane voids 239 may be small, and the distance $P_1$ between centers of the other adjacent in-plane voids 239 may be great.

Furthermore, the shape of the in-plane void 239 in the top plan view is not limited to a circle, as illustrated in FIG. 4. The shape of the in-plane void 239 may vary depending on the condition of irradiation and scanning of laser light. Similarly, the shape of the internal void for product line 258 in the internal void array for product line 250 viewed in the cross-sectional view is not limited to an ellipse, as illustrated in FIG. 5. The shape of the cross section of the internal void for product line 258 may vary depending on the condition of irradiation and scanning of laser light.

FIG. 5 shows that the adjacent internal voids for product line 258 in the internal void array for product line 250 are separated from each other. However, the embodiment is not limited to the above-described configuration, and for at least one pair of the adjacent internal voids for product line 258, the internal voids may contact with each other.

FIGS. 6 and 7 show that the release line 240 includes a second in-plane void array 241 on the first main surface 212. The second in-plane void array 241 is configured of a plurality of in-plane voids 249 arranged on the first main surface 212.

Moreover, the second in-plane void array 241 includes a plurality of internal void arrays 260 (in the following, referred to as "internal void arrays for release line 260"), each extending from the first main surface 212 of the first glass plate 200 to the second main surface 214. In other words, each internal void array for release line 260 extends below a corresponding in-plane void 249.

In the internal void array for release line 260, a plurality of internal voids 268 (in the following, referred to as "internal voids for release line 268") are arranged. In other words, the plurality of internal voids for release line 268 are arranged in a line, thereby the internal void array for release line 260 is formed.

The extension direction of the internal void array for release line 260 is not limited to the direction orthogonal to the first main surface 212. The internal void array for release line 260 may extend in a direction inclined from the thickness direction of the first glass plate 200.

FIGS. 6 and 7 show that a distance $P_2$ between centers of adjacent in-plane voids 249 in the second in-plane void array 241 in the release line 240 is the same for any of the in-plane voids 249. However, the embodiment is not limited to the above-described configuration, and the distance $P_2$ between centers of the adjacent in-plane voids 249 may vary depending on the in-plane void 249. The distance $P_2$ between centers of the adjacent in-plane voids 249 may be small, and the distance $P_2$ between centers of the other adjacent in-plane voids 249 may be great.

Furthermore, the shape of the in-plane void 249 in the top plan view is not limited to a circle, as illustrated in FIG. 7. The shape of the in-plane void 249 may vary depending on the condition of irradiation and scanning of laser light. Furthermore, the in-plane void 249 may be absent in the release line 240, which will be described later.

Similarly, the shape of the internal void for release line 268 in the internal void array for release line 260 viewed in the cross-sectional view is not limited to an ellipse, as illustrated in FIG. 7. The shape of the cross section of the internal void for release line 268 may vary depending on the condition of irradiation and scanning of laser light.

FIG. 7 shows that the adjacent internal voids for release line 268 in the internal void array for release line 260 are separated from each other. However, the embodiment is not limited to the above-described configuration, and for at least one pair of the adjacent internal voids for release line 268, the internal voids may contact with each other.

The embodiment of the present invention has a feature that a maximum distance $P_{1max}$ between centers of adjacent in-plane voids 239 in the first in-plane void array 231 in the product line 230 is less than a maximum distance $P_{2max}$ between centers of adjacent in-plane voids 249 in the second in-plane void array 241 in the release line 240, i.e. $P_{2max} > P_{1max}$.

FIGS. 4 to 7 show that the distance $P_2$ between centers of adjacent in-plane voids 249 (spacing of in-plane voids) in the second in-plane void array 241 in the release line 240 (constant value) is greater than the distance $P_1$ between centers of adjacent in-plane voids 239 in the first in-plane void array 231 in the product line 230 (constant value).

The maximum distance $P_{1max}$ falls within a range of 1 μm to 10 μm, and the maximum distance $P_{2max}$ is greater than 10 μm.

Mainly from viewpoints of the smoothness of the end face of the glass article 280 and of the irradiation time of laser light, the maximum distance $P_{1max}$ preferably falls within a range of 1 μm to 8 μm, more preferably a range of 3 μm to 6 μm, and further preferably a range of 3 μm to 5 μm. The maximum distance $P_{2max}$ is preferably greater than 10 μm and less than or equal to 25 μm, more preferably greater than 10 μm and less than or equal to 23 μm, and further preferably falls within a range of 13 μm to 20 μm.

The maximum distance $P_{1max}$ indicates the "substantial" maximum value for the pair of in-plane voids 239 adjacent to each other (in the following, referred to as the "in-plane void pair A") in the first in-plane void array 231 included in the product line 230.

Similarly, the maximum distance $P_{2max}$ indicates the "substantial" maximum value for the pair of in-plane voids 249 adjacent to each other (in the following, referred to as the "in-plane void pair B") in the second in-plane void array 241 included in the release line 240.

For example, although the maximum distance $P_{1max}$ "substantially" falls within a range of 1 μm to 10 μm, there may be a pair of in-plane voids having a distance $P_1$ greater than $P_{1max}$ among the in-plane void pairs A.

With the actual machining accuracy in the manufacturing process, dispersion in the distance between centers $P_1$ to some extent is unavoidable.

Moreover, in the process of forming the product line 230 having a loop shape, when a distance between an in-plane void 239 at the beginning (referred to as an "in-plane void for starting point") and an in-plane void 239 at the end (referred to as an "in-plane void for final point") is less than a predetermined value (e.g. 20 μm), an in-plane void may not be formed between the in-plane void for starting point and the in-plane void for final point. If an in-plane void is not formed between the in-plane void for starting point and the in-plane void for final point, a distance between the in-plane void for starting point and the in-plane void for final point could be considered as the maximum distance between centers $P_{1max}$. However, such a maximum distance $P_{1max}$ would not reflect the property of the product line 230.

In the present application, in order to exclude the influence of such an exceptional in-plane void pair A, described as above, the maximum distance between centers $P_{1max}$ is obtained using in-plane void pairs A having typical distances between centers $P_1$. Typically, the exceptional in-plane void pairs A in the product line 230 are less than 1 percent of a whole. In the present application, the maximum distance between centers $P_{1max}$ is obtained using the in-plane void pairs A of more than 99 percent of a whole, excluding the exceptional in-plane void pairs A.

In other words, in the present application, the maximum distance between centers $P_{1max}$ is defined to be the maximum value of the distances between centers obtained from the in-plane void pairs A configuring the product line 230 of more than 99 percent of a whole.

The same applies to the in-plane void pairs B in order to obtain the maximum distance between centers $P_{2max}$.

When the product line 230 and the release lines 240 are formed so as to satisfy the above-described relation $P_{2max} > P_{1max}$, the glass article 280 is prevented from being unintentionally separated from the first glass plate 200 along the separation line 220 even if a stress is applied to the first glass plate 200, particularly to the separation line 220, i.e. the pre-separation is significantly prevented from occurring.

Thus, in the present application, the glass article 280 is separated from the first glass plate 200 in the predetermined process, i.e. the separation process. Moreover, the quality of the glass article 280 is prevented from being degraded due to scratches or cracks occurring on end faces of the glass article 280, when separated from the first glass plate 200 during handling of the first glass plate 200.

Also in the process of chemically tempering the first glass plate 200 having the separation line 220, the pre-separation is prevented from occurring.

The release line 240 is formed so that the maximum distance $P_{2max}$ between centers of the adjacent in-plane voids 249 is greater than 10 μm. When the maximum distance $P_{2max}$ between centers of the adjacent in-plane voids 249 falls within a range of 13 μm to 20 μm, by irradiating the first glass plate 200 with $CO_2$ laser along the separation line 220, the separation is performed also along the release lines 240, in addition to the product line 230, which will be described in detail later. Thus, the glass article 280 is properly separated from the first glass plate 200 by irradiating with $CO_2$ laser in the separation process.

As described above, in the embodiment of the present application, a glass plate, in which the pre-separation is less likely to occur, and in which a glass article is easily separated in a predetermined process, i.e. the separation process, is provided.

(Other Features)

In the following, the features of the first glass plate 200 will be described.

(First Glass Plate 200)

Compositions of the first glass plate 200 are not particularly limited. The first glass plate 200 may be made of, for example, a soda lime glass or an alkali aluminosilicate glass.

The shape of the first glass plate 200 is not particularly limited. The first glass plate 200 may have an approximately rectangular shape, or an approximately circular shape.

The thickness of the first glass plate 200 is not particularly limited. The thickness may fall within a range of 0.03 mm to 6 mm. When the first glass plate 200 is used in a building or a house, or installed in a vehicle, the thickness of the first glass plate 200 may fall within a range of 2 mm to 19 mm, for example.

The first glass plate 200 may be a chemically tempered glass. In this case, an end face of the glass article 280 separated from the first glass plate 200 is chemically tempered.

(Product Line 230)

The product line 230 illustrated in FIG. 3 has a shape of a single loop. The number of product lines 230 and the shape are not particularly limited to this. The product line 230 may include four lines, as illustrated in FIG. 1. Moreover, the product line 230 may have another shape.

FIG. 3 shows that one glass article 280 is extracted from one first glass plate 200. The embodiment is not limited to this, and a plurality of glass articles 280 may be extracted from one first glass plate 200.

FIG. 4 shows that the product line 230 includes the plurality of in-plane voids 239 on the first surface 212 of the first glass plate 200. The product line 230 may also include a plurality of in-plane voids on the second surface 214 of the first glass plate 200. In this case, the glass article 280 is more easily separated from the first glass plate 200.

The in-plane voids 239 of the product line 230, illustrated in FIGS. 4 and 5, are arranged at equal intervals. In this case, the distance $P_1$ between centers of the adjacent in-plane voids 239 preferably falls within a range of 1 μm to 8 μm.

Moreover, in the internal void array for product line 250, an interval between the adjacent internal voids for product line 258, i.e. a distance between a lower end of an upper internal void for product line 258 and an upper end of a lower internal void for product line 258, preferably falls within a range of 0 to 50 μm, more preferably 0 to 20 μm, and further preferably 0 to 10 μm. In this case, the glass article 280 is more easily separated from the first glass plate 200, and the end face of the glass article 280 becomes smoother.

(Release Line 240)

FIG. 3 shows that the release lines 240 include four lines each extending in a longitudinal direction (Y-axis direction) or in a lateral direction (X-axis direction) on the first main surface 212. The number and the shape of release lines are not particularly limited. The release lines 240 may include lines arranged on the same lines as the product lines 230. The release line 240 may include a curve or two or more curves. Moreover, the release line 240 may have another shape.

The release line 240 illustrated in FIGS. 6 and 7 includes the plurality of in-plane voids 249 on the first main surface 212 of the first glass plate 200. The release line may also include a plurality of in-plane voids on the second surface 214 of the first glass plate 200.

The in-plane voids 249 of the release line 240, illustrated in FIGS. 6 and 7, are arranged at equal intervals $P_2$. In this case, the distance $P_2$ between centers of the adjacent in-plane voids 249 preferably falls within a range of 10 μm to 25 μm.

The number and the shape of the internal voids for release line 268 included in the internal void array for release line 260 are not particularly limited.

In the following, the internal void array for release line 250 according to another aspect of the embodiment will be described with reference to FIGS. 8 to 10.

Figure 8:
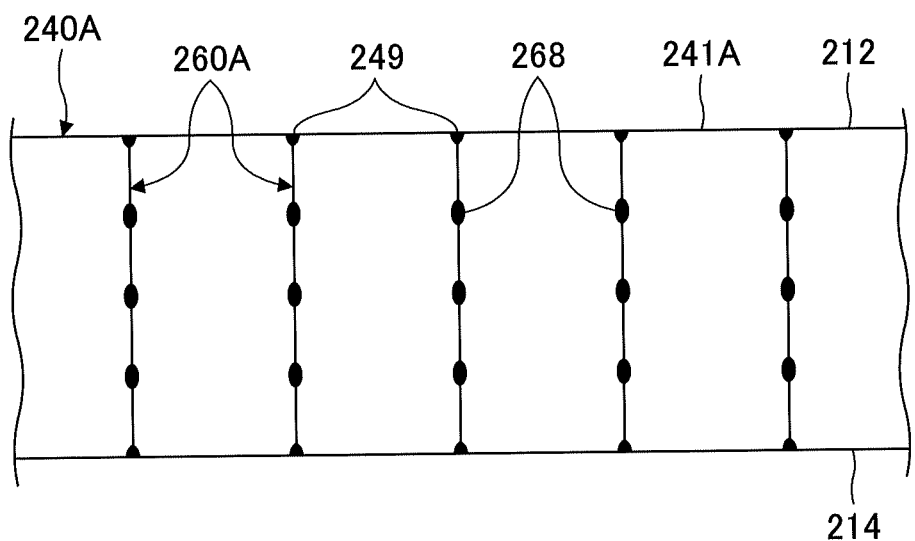
FIG. 8 is a cross-sectional view schematically depicting an aspect of an internal void array for release line configuring the release line according to the embodiment.

FIG. 8 is a diagram schematically depicting an example of an internal void array for release line included in a release line according to another aspect of the embodiment. FIG. 8 is a cross-sectional diagram schematically depicting a part of the internal void array for release line.

FIG. 8 shows that the release line 240A includes a second in-plane void array 241A on the first main surface 212 of the glass plate. The second in-plane void array 241A includes an array of in-plane voids 249.

An internal void array for release line 260A extends below each of the in-plane voids 249 included in the release line 240A. The internal void array 260A for release line 260A includes a plurality of internal voids for release line 268.

A configuration of the release line 240A illustrated in FIG. 8 is different from the configuration of the release line 240 illustrated in FIG. 7 in that the number of the internal voids for release line 268 included in each of the internal void arrays for release line 260A is less than that in each of the internal void arrays for release line 260, i.e. a density of voids in the release line 240A is less than that in the release line 240.

The density of voids in each of the internal void arrays for release line 260 in the release line 240 illustrated in FIG. 7 is almost the same as the density of voids in each of the internal void arrays for product line 250 in the product line 230 illustrated in FIG. 5. However, the density of voids in each of the internal void arrays for release line 260A in the release line 240A illustrated in FIG. 8 is less than the density of voids in each of the internal void arrays for product line 250 in the product line 230 illustrated in FIG. 5.

When the interval between the adjacent internal voids for release line 268 in the release line 240A is made sparse, as described above, the pre-separation is prevented from occurring.

Figure 9:
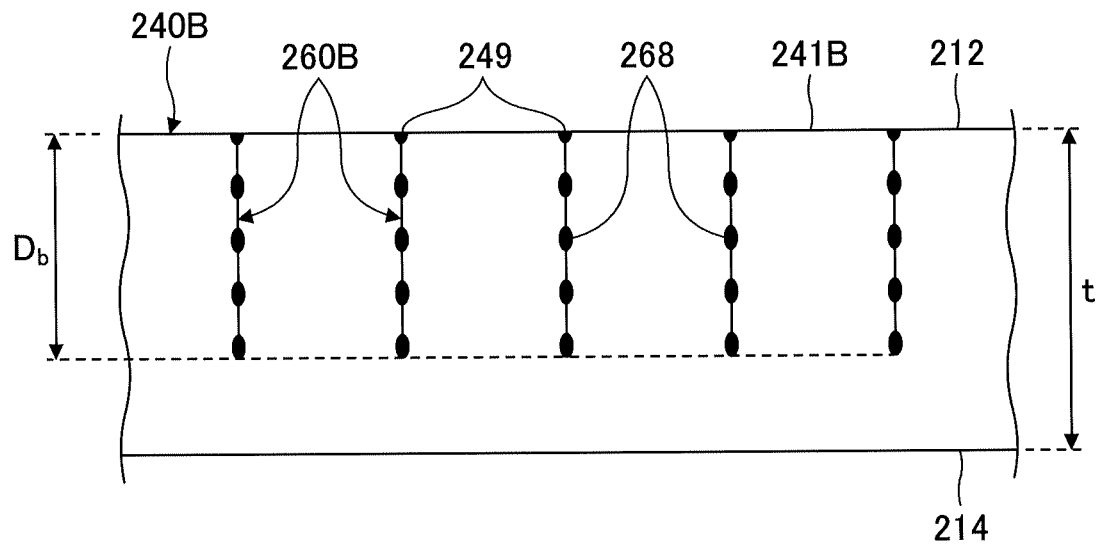
FIG. 9 is a cross-sectional view schematically depicting another aspect of the internal void array for release line configuring the release line according to the embodiment.

FIG. 9 is a diagram schematically depicting another aspect of the internal void arrays for release line configuring the release line. FIG. 9 is a cross-sectional view schematically illustrating a part of the internal void arrays for release line.

FIG. 9 shows that the release line 240B includes a second in-plane void array 241B on the first main surface 212 of the glass plate. The second in-plane void array 241B includes an array of in-plane voids 249.

The release line 240B includes an internal void array for release line 260B extending downward, with respect to each of the in-plane voids 249. The internal void array for release line 260B includes a plurality of internal voids for release line 268.

A configuration of the release line 240B illustrated in FIG. 9 is different from the configuration of the release line 240 illustrated in FIG. 7 in that the number of the internal voids for release line 268 included in each of the internal void arrays for release line 260B is less than that in each of the internal void arrays for release line 260. Moreover, the internal voids for release line 268 are not arranged on the second main surface 214, i.e. the extension of the internal void array for release line 260B including the internal voids for release line 268 in the thickness direction of the glass plate ends in the middle of the glass plate.

In the following, particularly the above-described internal void array for release line 260B will be referred to as an "unpenetrating type internal void array".

A length of a range of extension (extension length) of the internal void array for release line 260B in the thickness direction of the glass plate, illustrated in FIG. 9, will be denoted by $D_b$. The length $D_b$ preferably falls within a range of 40% to 95% of the distance between the first main surface 212 and the second main surface 214 (i.e. the thickness of the glass plate t).

An interval between the adjacent internal voids for release line 268 in the internal void array for release line 260B is the same as the interval between the adjacent internal voids for product line 258 in the product line 230 (See FIG. 5). The embodiment of the present invention is not limited to this, and the interval between the adjacent internal voids for release line 268 may be different from the interval between the adjacent internal voids for product line 258 illustrated in FIG. 5.

FIG. 9 shows that the internal void array for release line 260B includes in-plane voids 249 on the first main surface 212. However, the internal void array for release line 260B may include in-plane voids 249 on the second main surface 214.

The release line 240B having the above-described configuration prevents the pre-separation from occurring.

Figure 10:
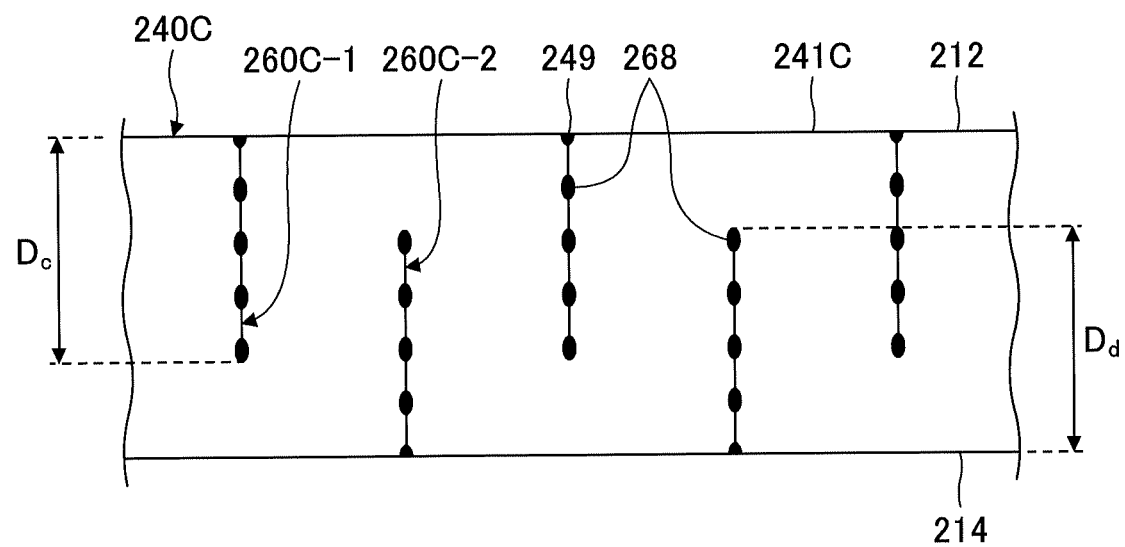
FIG. 10 is a cross-sectional view schematically depicting yet another aspect of the internal void array for release line configuring the release line according to the embodiment.

FIG. 10 is a diagram schematically depicting another aspect of the internal void array for release line configuring the release line. FIG. 10 is a cross-sectional view schematically illustrating a part of the internal void arrays for release line.

FIG. 10 shows that the release line 240C includes a second in-plane void array 241C on the first main surface 212 of the glass plate. The release line 240C includes the "unpenetrating type internal void array" included also in the release line 240B.

The "unpenetrating type internal void arrays" arranged along the second in-plane void array 241C in the release line 240C alternate an internal void array that does not penetrate the first main surface 212 and an internal void array that does not penetrate the second main surface 214, different from the release line 240B illustrated in FIG. 9.

In the release line 240C, in an order of an internal void array for release line 260C-1 that does not penetrate the second main surface 214, an internal void array for release line 260C-2 that does not penetrate the first main surface 212, the internal void array for release line 260C-1 that does not penetrate the second main surface 214 . . . , internal void arrays for release line are arranged along the second in-plane void array 241C.

A length of a range of extension of the internal void array for release line 260C-1 in the thickness direction of the glass plate will be denoted by $D_c$, and a length of a range of extension of the internal void array for release line 260C-2 in the thickness direction will be denoted by $D_d$. The lengths $D_c$ and $D_d$ preferably fall within a range of 40% to 95% of the distance between the first main surface 212 and the second main surface 214 (i.e. the thickness of the glass plate t).

The lengths $D_c$ and $D_d$ are not required to be the same, and may be different from each other. The lengths $D_c$ of the internal void arrays for release line 260C-1 may be different from each other. The lengths $D_d$ of the internal void arrays for release line 260C-2 may be different from each other.

The release line 240C having the above-described configuration prevents the pre-separation from occurring.

Figure 11:
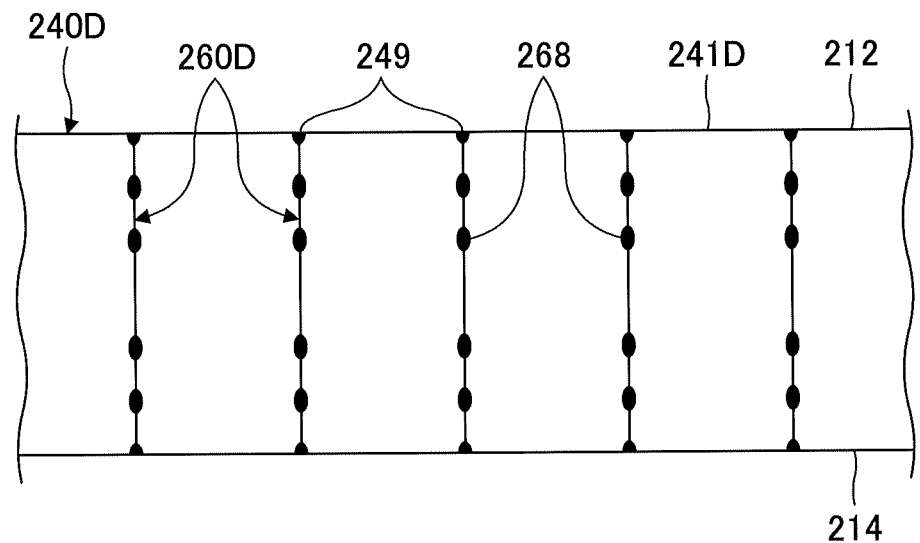
FIG. 11 is a cross-sectional view schematically depicting still another aspect of the internal void array for release line configuring the release line according to the embodiment.

FIG. 11 is a diagram schematically depicting another aspect of the internal void array for release line configuring the release line. FIG. 11 is a cross-sectional view schematically illustrating a part of the internal void arrays for release line.

FIG. 11 shows that the release line 240D includes a second in-plane void array 241D on the first main surface 212 of the glass plate. The second in-plane void array 241D includes an array of the in-plane voids 249.

The release line 240D includes an internal void array for release line 260D extending downward, with respect to each of the in-plane voids 249. The internal void array for release line 260D includes a plurality of internal voids for release line 268.

A configuration of the release line 240D illustrated in FIG. 11 is different from the configuration of the release line 240 illustrated in FIG. 7 in that the number of the internal voids for release line 268 included in each of the internal void arrays for release line 260D is less than that in each of the internal void arrays for release line 260. Particularly, the internal void for release line 268 is not arranged approximately at the center of the internal void array for release line 260D in the thickness direction.

The release line 240D having the above-described configuration prevents the pre-separation from occurring.

In the internal void array for release line 260D illustrated in FIG. 11, an internal void for release line 268 is missing approximately at the center in the thickness direction, different from the internal void array for release line 260 illustrated in FIG. 7. The embodiment of the present invention is not limited to this. Any of internal voids for release line 268 may be missing. The positions and numbers of the missing internal voids for release line 268 in the internal void arrays for release line 260D may be different from each other.

Figure 12:
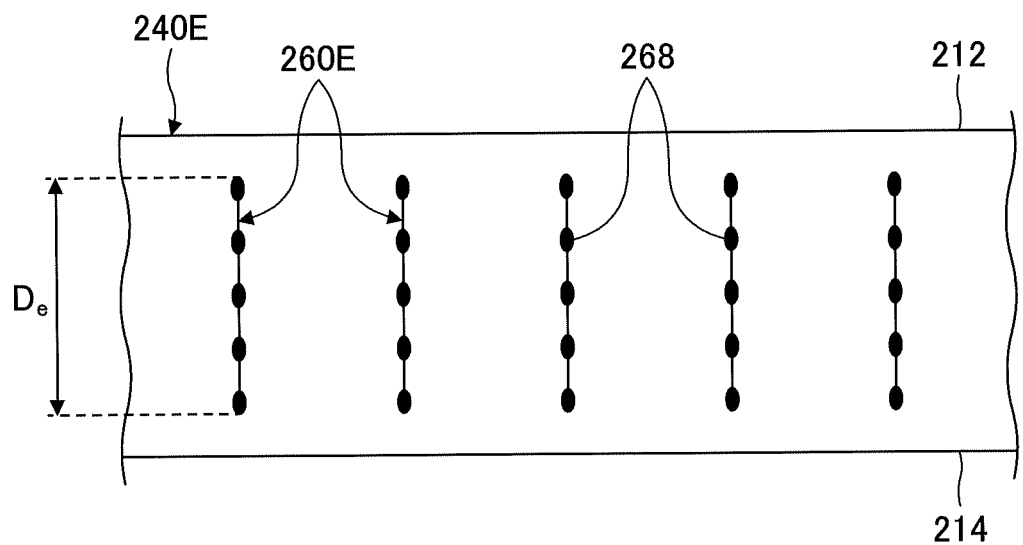
FIG. 12 is a cross-sectional view schematically depicting yet another aspect of the internal void array for release line configuring the release line according to the embodiment.

FIG. 12 is a diagram schematically depicting another aspect of the internal void array for release line configuring the release line. FIG. 12 is a cross-sectional view schematically illustrating a part of the internal void arrays for release line.

FIG. 12 shows that the release line 240E does not include a second in-plane void array on either of the first main surface 212 or the second main surface 214 of the glass plate. An in-plane void is not present on either of the first main surface 212 or the second main surface 214.

Thus, the release line 240E is not viewable from the first main surface 212 side or the second main surface 214 side of the glass plate. The release line 240E is a "virtual" line. The "virtual" release line 240E will be described later.

The release line 240E includes a plurality of internal void arrays for release line 260E extending from the first main surface 212 side toward the second main surface 214 side in the glass plate. The internal void array for release line 260E includes a plurality of internal voids for release line 268.

A length of a range of extension of the internal void array for release line 260E in the thickness direction of the glass plate, illustrated in FIG. 12, will be denoted by $D_e$. The length $D_e$ preferably falls within a range of 40% to 95% of the distance between the first main surface 212 and the second main surface 214 (i.e. the thickness of the glass plate t).

An interval between the adjacent internal voids for release line 268 in the internal void array for release line 260E is the same as the interval between the adjacent internal voids for product line 258 in the product line 230 (See FIG. 5). The embodiment of the present invention is not limited to this, and the interval between the adjacent internal voids for release line 268 may be different from the interval between the adjacent internal voids for product line 258 illustrated in FIG. 5.

The release line 240E having the above-described configuration prevents the pre-separation from occurring.

It is necessary to be noted that a person skilled in the art may think of other forms of the internal void for release line 268, in addition to the above-described forms. For example, at least two forms from among the configurations illustrated in FIGS. 8 to 12 may be combined.

As described above, the embodiment of the present invention has the feature that a maximum distance $P_{1max}$ between centers of adjacent in-plane voids 239 in the first in-plane void array 231 in the product line 230 is less than a maximum distance $P_{2max}$ between centers of adjacent in-plane voids 249 in the second in-plane void array 241 in the release line 240, i.e. $P_{2max} > P_{1max}$.

However, the "virtual" release line 240E, as illustrated in FIG. 12, does not include an in-plane void on the first main surface 212.

Moreover, the release line 240C, illustrated in FIG. 10, includes in-plane voids 249 observed on the first main surface 212. However, the observed in-plane voids 249 correspond only to the internal void arrays for release line 260C-1. In-plane voids corresponding to the internal void arrays for release line 260C-2 are not present on the first main surface 212.

Thus, the relation between the maximum distances between centers $P_{1max}$ and $P_{2max}$ may not be properly evaluated for the internal void arrays for release line, which are different from the internal void array for release line 260 illustrated in FIG. 7.

In the present application, an in-plane void is assumed to be virtually present (in the following, referred to as a "virtual in-plane void") at a point where an extension line, extending in the thickness direction from the internal void array for release line included in the glass plate to the first main surface 212, crosses with the first main surface 212. Moreover, the "virtual in-plane voids" are assumed to be arranged, to form a second in-plane void array for release line.

When an in-plane void in the internal void array for release line is present on the first main surface 212, the in-plane void on the first main surface 212 is assumed to be a "virtual in-plane void" configuring a part of the second in-plane void array for release line.

According to the above-described assumption, even for the internal void array for release line, as illustrated in FIG. 10 or FIG. 12, the second in-plane void array and the "virtual in-plane voids" are properly arranged on the first main surface 212. Moreover, according to the above-described assumption, all internal void arrays for release line included in the release line are estimated, and a relation between the distances $P_{1max}$ and $P_{2max}$ is evaluated.

In summary, in-plane voids actually present on the first main surface 212 and virtual in-plane voids assumed to be present on the first main surface 212 are referred to as "virtual in-plane voids" configuring as a whole the second in-plane void array. A distance between centers of the adjacent "virtual in-plane voids" is denoted by $P_2$. The maximum value of $P_2$ is denoted by a distance between centers $P_{2max}$. Under the above-described assumption, the relation between $P_{1max}$ and $P_{2max}$ is evaluated.

(Manufacturing Method of Glass Plate According to Embodiment of Present Invention)

In the following, with reference to FIGS. 13 to 15, a manufacturing method of a glass plate according to an embodiment of the present invention will be described.

Figure 13:
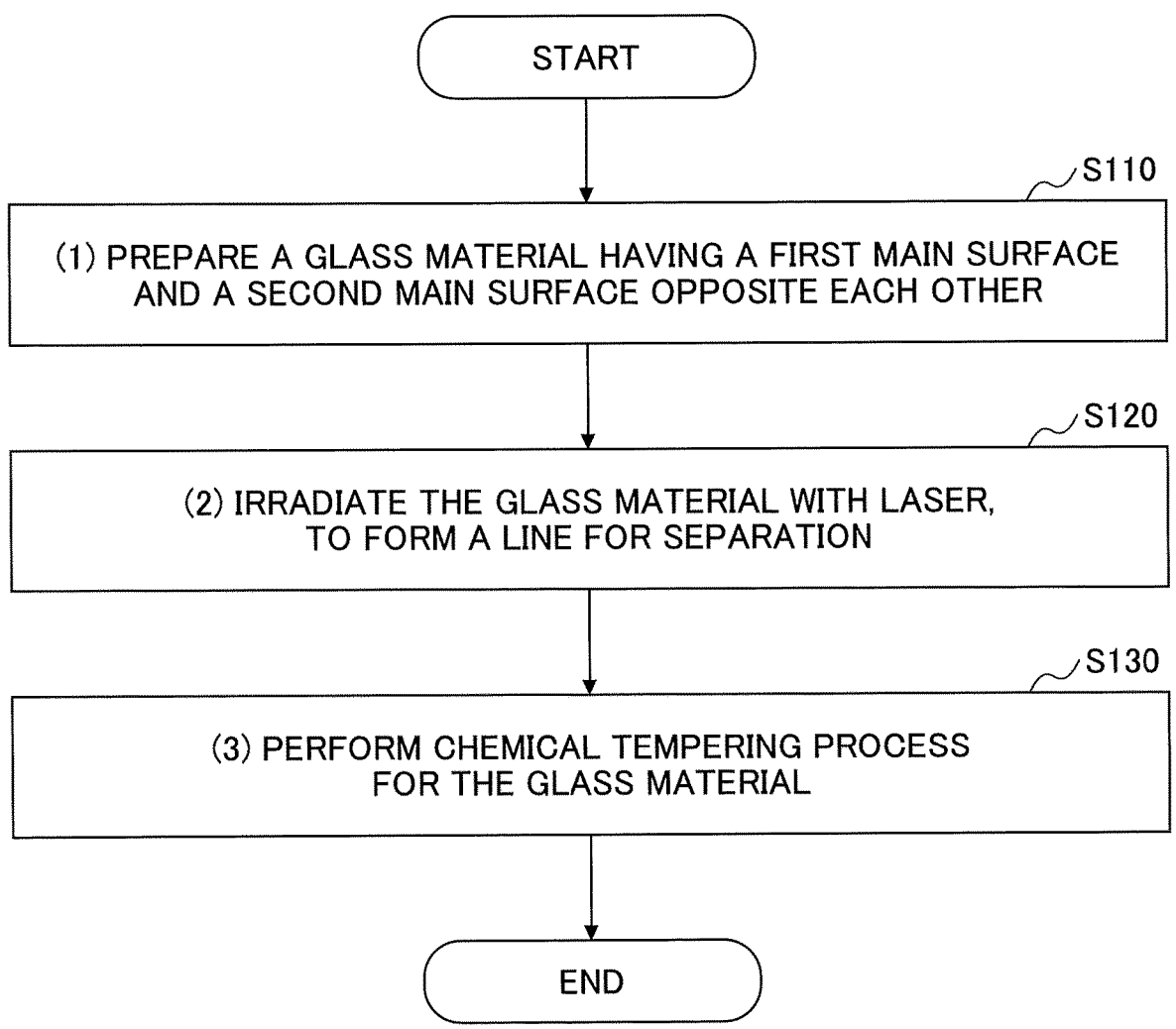
FIG. 13 is a flowchart schematically depicting an example of a flow of a manufacturing method of a glass plate according to the embodiment.

FIG. 13 is a flowchart schematically depicting an example of a flow of the manufacturing method of a glass plate according to the embodiment of the present invention (in the following, referred to as a "first manufacturing method").

FIG. 13 shows that the first manufacturing method includes:

(1) preparing a glass material having a first main surface and a second main surface opposite each other (step S110);

(2) irradiating the glass material with laser light to form a separation line in the glass material (step S120); and (3) performing a chemical tempering process for the glass material (step S130).

The process of step S130 in the first manufacturing method is not indispensable, and performed as necessary.

In the following, the processes (1) to (3) will be described in detail.

(Step S110)

A glass material is prepared. The glass material has a first main surface and a second main surface.

A composition of the glass material is not particularly limited. The glass material may be a soda lime glass, an alkali aluminosilicate glass or the like.

A thickness of the glass material is not particularly limited. The thickness may fall within a range of 0.03 mm to 6 mm, for example. When the glass material is used for a building or a house, or installed in a vehicle, the thickness of the glass material may fall within a range of 2 mm to 19 mm.

The glass material may be provided in a plate shape, or in a roll shape. A glass material of roll shape has an advantage of easy conveyance, compared with a glass material of plate shape. The first main surface and the second main surface of the glass material of plate shape are not necessarily flat, and may be curved.

A shape, viewed in the thickness direction, of the glass material of plate shape is not particularly limited. The glass material may have a rectangular shape, a circular shape, an elliptic shape or the like. In the following the glass material having a rectangular shape will be described as an example.

Figure 14:
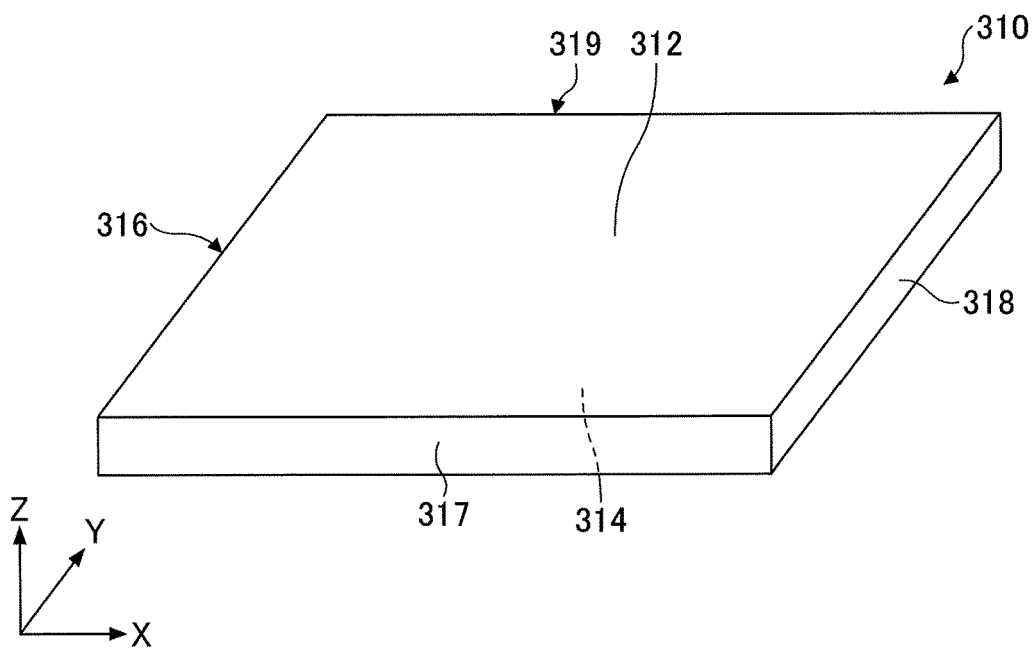
FIG. 14 is a perspective view schematically depicting an example of a glass material used in the manufacturing method of a glass plate according to the embodiment.

FIG. 14 is a perspective view schematically depicting the glass material having a rectangular shape.

FIG. 14 shows that the glass material 310 has a first main surface 312, a second main surface 314, and four end faces 316 to 319.

(Step S120)

The first main surface 312 of the glass material 310 is irradiated with laser light. Thus, a separation line is formed on the first main surface 312 of the glass material 310.

Figure 15:
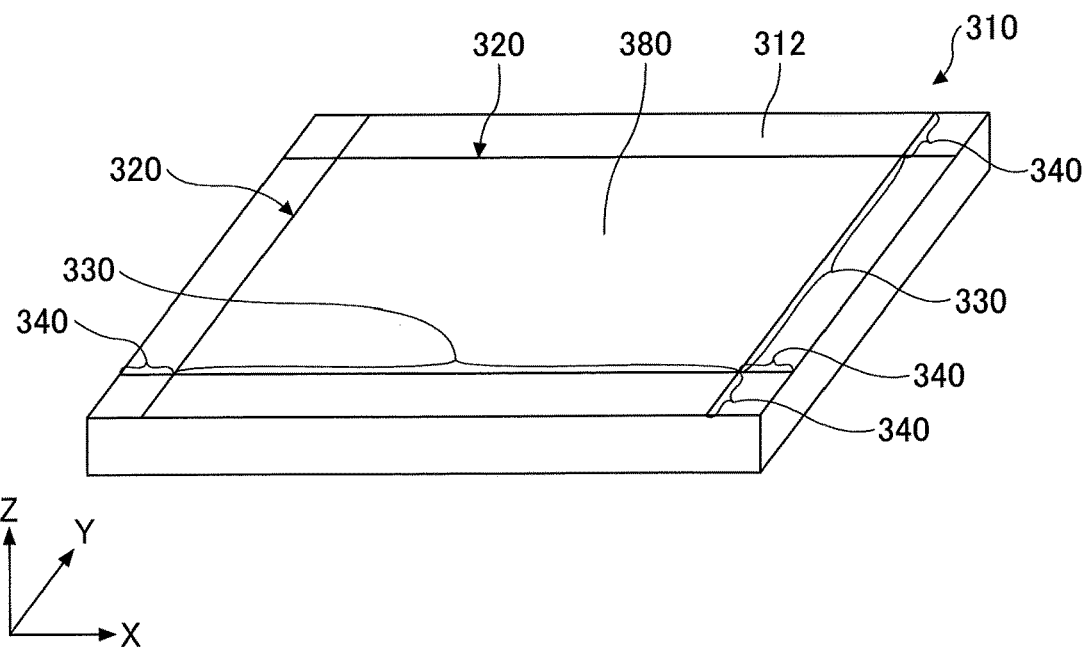
FIG. 15 is a diagram schematically depicting an example of a separation line formed on the glass material according to the embodiment.

FIG. 15 is a perspective view schematically depicting an example of the glass material 310 with a separation line 320 formed on the first main surface 312.

FIG. 15 shows that the separation line 320 includes the product line 330 and release lines 340.

As illustrated in FIG. 15, the product lines 330 include four lines extending in the longitudinal direction (Y-axis direction) or in the lateral direction (X-axis direction) formed approximately at the center of the first main surface 312. The release lines 340 include eight lines, each extending from an end of the product line 330 to any of the end faces 316 to 319 of the glass material 310. From approximately the central part of the glass material 310, on which the separation line 320 is formed, a glass article 380 defined by the product lines 330 is separated in the separation process, which will be described below.

As described above, the product line 330 includes a first in-plane void array formed by arranging a plurality of in-plane voids present on the first main surface 312; and an internal void array for product line extending in the plate thickness direction, with respect to each of the in-plane voids (not shown in FIG. 15).

The release line 340 according to the embodiment includes a second in-plane void array formed by arranging a plurality of in-plane voids present on the first main surface 312; and an internal void array for release line extending in the plate thickness direction, with respect to each of the in-plane voids (not shown in FIG. 15).

The shape of the separation line 320, i.e. the shape of the product line 330 and the shape of the release line 340 are not particularly limited. The release line 340 may not be viewable from outside, such as the release line 240E illustrated in FIG. 12.

The separation line 320 is formed so that, as described above, a maximum distance $P_{1max}$ between centers of the adjacent in-plane voids in the first in-plane void array of the product line 330 is less than a maximum distance $P_{2max}$ between centers of the adjacent in-plane voids in the second in-plane void array of the release line 340, i.e. $P_{2max} > P_{1max}$.

The distance $P_{1max}$ falls within a range of 1 μm to 10 μm, preferably a range of 1 μm to 8 μm, more preferably a range of 3 μm to 6 μm, and further preferably a range of 3 μm to 5 μm. The distance $P_{2max}$ is greater than 10 μm, preferably greater than 10 μm and less than or equal to 25 μm, more preferably greater than 10 μm and less than or equal to 23 μm, and further preferably falls within a range of 13 μm to 20 μm.

A laser device for forming the separation line 320 is, for example, a short pulse laser device that emits a laser light with a pulse width of the order of femtoseconds to the order of nanoseconds, i.e. the range of $1.0 \times 10^{-15}$ to $9.9 \times 10^{-9}$ seconds. The short pulse laser light is preferably burst pulses. An average power of the laser light within an irradiation period is, for example, 30 W or more. When the average power of the short pulse laser light is less than 10 W, a sufficient internal void may not be formed. A short pulse laser device used for forming an internal void array is, for example, a burst laser device with a burst number of 3 to 10, a laser output power of about 90% of the rated output (50 W), a burst frequency of about 60 kHz, and a time width of burst that falls within a range of 20 picoseconds to 165 nanoseconds. The time width of burst preferably falls within a range of 10 nanoseconds to 100 nanoseconds.

A method of irradiating the glass material with laser light includes a method using a self-focusing phenomenon based on the Kerr-effect; a method using Gaussian Bessel beam with an axicon lens; a method using a linear focus forming beam by an aberration lens; or the like. A condition for irradiation with laser light is not particularly limited, as long as the separation line 320 is formed.

After the process of step S120, a glass plate having the separation line 320 is produced.

As described above, even if a stress is applied to the glass plate having the separation line 320 in an unintentional stage, a pre-separation is prevented from occurring.

Thus, the first manufacturing method provides a glass plate in which a pre-separation is less likely to occur.

(Step S130)

According to the processes of step S110 and S120 of the first manufacturing method, a glass plate according to the embodiment of the present invention is produced.

However, the first manufacturing method may include a chemical tempering process after the process of step S120.

A typical chemical tempering process is performed by immersing a glass material to be processed in a molten salt containing alkali metal ions. A temperature of the molten salt during the chemical tempering process falls within a range of 430° C. to 500° C., for example. The glass material is exposed to the molten salt at a high temperature.

Because the glass plate produced by the processes of step S110 and step S120 in the first manufacturing process has the above-described feature, a pre-separation is less likely to occur even if the glass plate is exposed to the molten salt at the high temperature in the chemical tempering process.

The above-described separation line 320 is formed, by irradiating with laser light, in the glass material 310 to be subjected to the chemical tempering process.

The inventors of the present application have found that, in the chemical tempering process for the glass material 310 having the product line 330 including an in-plane void array on the first main surface 312, a molten salt enters an internal void array for product line through the in-plane void array, and a region defined by the in-plane void array of the product line 330 and the internal void array for product line, i.e. an end face of the glass article 380, is also chemically tempered.

Thus, when the glass article 380 is separated from the chemically tempered glass plate, the end face of the glass article 380 is already chemically tempered.

The glass article 380 is separated and extracted from the glass plate produced by the first manufacturing method, in a separation process after the process of the first manufacturing method.

In the separation process, the glass article 380 is required to be properly separated from the glass plate. Thus, a $CO_2$ laser device is typically used in the separation process.

When the $CO_2$ laser device is used for separating the glass article 380 by irradiating the glass plate with $CO_2$ laser light, the maximum distance $P_{2max}$ between centers of the adjacent in-plane voids in the release line 340 preferably falls within a range of 13 μm to 20 μm.

When the glass plate is irradiated with $CO_2$ laser light along the separation line 320, the glass plate is properly divided at the product line 330 and at the release line 340.

Thus, the problem that the glass article 380 cannot be separated from the glass plate in the separation process by irradiating with $CO_2$ laser light is less likely to occur for the glass plate produced by using the first manufacturing method.

As described above, in the manufacturing method for a glass plate according to the embodiment of the present invention, a glass plate, in which a pre-separation is less likely to occur, and from which a glass article is easily separated in a required process, i.e. the separation process, is produced.

EXAMPLES

In the following, examples of the present invention will be described. In the following descriptions, Examples 1 to 5 and Examples 8 to 14 are practical examples, and Examples 6 and 7 are comparative examples.

Example 1

(Manufacturing Glass Plate)

A glass plate having a separation line was manufactured according to the following method.

A glass material made of aluminosilicate glass having dimensions of 200 mm (longitudinal)×250 mm (lateral)×1.1 mm (thickness) was prepared. A first main surface of the glass material (one of surfaces having dimensions of 200 mm×250 mm) was irradiated with laser light, to form a product line and a release line.

A burst laser device (by Rofin-Sinar Laser GmbH, Germany) with a burst number of 3 emitting short pulse laser light with a pulse width of the order of picoseconds was used for Example 1. The output power of the laser device was 90% of the rated power (50 W).

The product line and the release line having the shape illustrated in FIG. 3 were formed in the glass material. The length in the longitudinal direction of the product line on the first main surface was 135 mm, and the length in the lateral direction was 200 mm. The lengths were measured by extrapolating the corner portions with lines. The length of the release line in the short side direction on the first main surface was 32.5 mm and the length of the release line in the long side direction was 22.5 mm.

In Example 1, the distance $P_1$ between centers of the adjacent in-plane voids in the in-plane void array in the product line was fixed to 5 μm. The internal void array for product line was made to have the form illustrated in FIG. 5, i.e. each of the internal void arrays for product line extended in the thickness direction of the glass material from the first main surface to the second main surface, and had an in-plane void on the first main surface and an in-plane void on the second main surface. The internal void array for product line included about 500 to 1000 internal voids for product line.

The release line was made to have the configuration illustrated in FIGS. 6 and 7. The distance $P_2$ between centers of the adjacent in-plane voids in the release line was fixed to 20 μm. Each of the internal void arrays for release line was made to extend in the thickness direction of the glass material, and had an in-plane void on the first main surface and an in-plane void on the second main surface. The internal void array for release line included about 10 to 1000 internal voids for release line.

As described above, the glass plate having the separation line (in the following, referred to as a "glass plate according to Example 1") was manufactured.

Example 2

A glass plate having a separation line (in the following, referred to as a "glass plate according to Example 2") was manufactured in the same way as Example 1.

In Example 2, the release line was made to have the configuration illustrated in FIG. 9, i.e. each of the internal void arrays for release line extended in the thickness direction of the glass material from the first main surface, but did not reach the second main surface. Each of the internal void arrays for release line was located from the first main surface to an internal point of the glass material. A size of the internal void array for release line $D_b$ (See FIG. 9) was about 40% of the thickness t of the glass material.

The internal void array for release line included about 10 to 400 internal voids for release line.

Examples 3 to 6 and Examples 8 to 10

Glass plates having separation lines (in the following, referred to as "glass plates according to Examples 3 to 6 and Examples 8 to 10) were manufactured in the same way as Example 1.

In each of Examples 3 to 6 and Examples 8 to 10, the distance $P_1$ between centers of the adjacent in-plane voids in the in-plane void array for product line was fixed to 5 μm. The internal void array for product line was made to have the configuration illustrated in FIG. 5. The release line was formed to have the configuration illustrated in FIGS. 6 and 7. The distance between centers of the adjacent in-plane voids for release line was fixed to 17 μm in Example 3, 15 μm in Example 4, 13 μm in Example 5, 10 μm in Example 6, 21 μm in Example 8, 22 μm in Example 9, and 23 μm in Example 10. The internal void array for release line in each Example was made to extend in the thickness direction of the glass material from the first main surface to the second main surface, and had an in-plane void on the first main surface and an in-plane void on the second main surface.

Example 7

A glass plate having a separation line (in the following, referred to as a "glass plate according to Example 7") was manufactured in the same way as Example 1.

In Example 7, the release line was made to have the same configuration as the product line, i.e. the distance $P_2$ between centers of the adjacent in-plane voids for release line was fixed to 5 μm, which was the same as the distance $P_1$. The internal void array for release line includes about 10 to 1000 internal voids for release line.

Example 11

A glass plate having a separation line (in the following, referred to as a "glass plate according to Example 11") was manufactured in the same way as Example 1.

In Example 11, the distance $P_1$ between centers of the adjacent in-plane voids in the in-plane void array for product line was fixed to 7 μm. The internal void array for product line was made to have the form illustrated in FIG. 5. The release line was made to have the configuration illustrated in FIGS. 6 and 7. The distance $P_2$ between centers of the adjacent in-plane voids in the release line was fixed to 20 μm. Each of the internal void arrays for release line was made to extend in the thickness direction of the glass material from the first main surface to the second main surface, and had an in-plane void on the first main surface and an in-plane void on the second main surface.

Example 12

A glass plate having a separation line (in the following, referred to as a "glass plate according to Example 12") was manufactured in the same way as Example 1.

In Example 11, the distance $P_1$ between centers of the adjacent in-plane voids in the in-plane void array for product line was fixed to 10 μm. The internal void array for product line was made to have the form illustrated in FIG. 5. The release line was made to have the configuration illustrated in FIGS. 6 and 7. The distance $P_2$ between centers of the adjacent in-plane voids in the release line was fixed to 20 μm. Each of the internal void arrays for release line was made to extend in the thickness direction of the glass material from the first main surface to the second main surface, and had an in-plane void on the first main surface and an in-plane void on the second main surface.

Example 13

A glass plate having a separation line (in the following, referred to as a "glass plate according to Example 13") was manufactured in the same way as Example 1.

In Example 13, a thickness of the glass material was 2.0 mm.

The distance $P_1$ between centers of the adjacent in-plane voids in the in-plane void array for product line was fixed to 5 μm. The internal void array for product line was made to have the form illustrated in FIG. 5. The release line was made to have the configuration illustrated in FIGS. 6 and 7. The distance $P_2$ between centers of the adjacent in-plane voids in the release line was fixed to 20 μm. Each of the internal void arrays for release line was made to extend in the thickness direction of the glass material from the first main surface to the second main surface, and had an in-plane void on the first main surface and an in-plane void on the second main surface.

Example 14

A glass plate having a separation line (in the following, referred to as a "glass plate according to Example 14") was manufactured in the same way as Example 1.

In Example 14, a thickness of the glass material was 2.0 mm. The distance $P_1$ between centers of the adjacent in-plane voids in the in-plane void array for product line was fixed to 5 μm. The internal void array for product line was made to have the form illustrated in FIG. 5. The release line was made to have the configuration illustrated in FIGS. 6 and 7. The distance $P_2$ between centers of the adjacent in-plane voids in the release line was fixed to 23 μm. Each of the internal void arrays for release line was made to extend in the thickness direction of the glass material from the first main surface to the second main surface, and had an in-plane void on the first main surface and an in-plane void on the second main surface.

(Evaluation)

The following evaluation was performed for Examples 1 to 14.

(Evaluation of Pre-Separation Resistance)

A chemical tempering process was performed for the glass plate in each Example, and an occurrence of the pre-separation was evaluated.

The chemical tempering process was performed by immersing the glass plate in a molten salt containing potassium nitrate. The highest temperature in the process was 450° C. The glass plate was immersed in the molten salt at 450° C. for about 100 minutes, and was cooled slowly.

The glass plate in which the pre-separation did not occur after the chemical tempering process was determined to be "Good". The glass plate in which the pre-separation occurred after the chemical tempering process was determined to be "Poor".

(Evaluation of Separation Easiness)

Evaluation of a separation easiness of a glass article was performed for each of the glass plates in Examples 1 to 5 and 8 to 14. The separation easiness was evaluated as a reference, because the glass article may be separated from the glass plate using a device other than the $CO_2$ laser device.

Specifically, the first main surface of the glass plate in each Example was irradiated with $CO_2$ laser light along the separation line, and it was evaluated whether a glass article was separated and extracted from the glass plate.

The output power of the $CO_2$ laser device was 47.3 W, and the scanning rate was 180 mm/s along the product line and 50 mm/s along the release line.

When a glass article could be separated and extracted from the glass plate after the irradiation with $CO_2$ laser light, the glass plate was determined to be "Good". When a glass article could not be separated from the glass plate after the irradiation with $CO_2$ laser light, the glass plate was determined to be "Poor".

TABLE 1, in the following, shows the configurations of the product line and the release line; and the results of evaluations of pre-separation resistance and separation easiness for the glass plates according to Examples 1 to 14 as a whole. For the glass plates according to Examples 6 and 7, the evaluation of separation easiness was not performed because of occurrence of the pre-separation.

TABLE 1

| | | Product line | Release line | | | |
| | | Spacing of in-plane voids $P_1$ ($\mu$m) | Spacing of in-plane voids $P_2$ ($\mu$m) | Ratio of extension length $D_b$ to thickness of glass material t | Evaluation | |
| Example | Thickness of glass material t (mm) | | | | Pre-separation | Separation easiness by $CO_2$ laser light |
| --- | --- | --- | --- | --- | --- | --- |
| 1 | 1.1 | 5 | 20 | 1 | Good | Good |
| 2 | 1.1 | 5 | 20 | 0.4 | Good | Good |
| 3 | 1.1 | 5 | 17 | 1 | Good | Good |
| 4 | 1.1 | 5 | 15 | 1 | Good | Good |
| 5 | 1.1 | 5 | 13 | 1 | Good | Good |
| 6 | 1.1 | 5 | 10 | 1 | Poor | — |
| 7 | 1.1 | 5 | 5 | 1 | Poor | — |
| 8 | 1.1 | 5 | 21 | 1 | Good | Poor |
| 9 | 1.1 | 5 | 22 | 1 | Good | Poor |
| 10 | 1.1 | 5 | 23 | 1 | Good | Poor |
| 11 | 1.1 | 7 | 20 | 1 | Good | Good |
| 12 | 1.1 | 10 | 20 | 1 | Good | Good |
| 13 | 2.0 | 5 | 20 | 1 | Good | Good |
| 14 | 2.0 | 5 | 23 | 1 | Good | Poor |

From the results of the evaluations, the pre-separation was not found to occur in each of the glass plates according to Examples 1 to 5 and Examples 8 to 14, even if the chemical tempering process was performed. Moreover, it was found that a glass article was properly separated from each of the glass plates according to Examples 1 to 5 and Examples 11 to 13 by irradiating the glass plate with a $CO_2$ laser light along the separation line. For the glass plates according to Examples 8 to 10 and Example 14, from which a glass article was not separated by irradiating with $CO_2$ laser light, another method such as mechanically applying a load on the glass plate in order to separate the glass article may be used.

REFERENCE SIGNS LIST 1 glass plate in the related art
12 first main surface
14 second main surface
16 first end face
17 second end face
18 third end face
19 fourth end face
20 separation line
30 product line
32 release line
80 glass article
101 glass material
102 first main surface
104 second main surface
139 in-plane void
150 internal void array
158 internal void
200 first glass plate
212 first main surface
214 second main surface
216 first end face
217 second end face
218 third end face
219 fourth end face
220 separation line
230 product line
231 first in-plane void array
239 in-plane void
240, 240A to 240E release line
241, 241A to 241D second in-plane void array
249 in-plane void
250 internal void array for product line
258 internal void for product line
260, 260A to 260E internal void array for release line
268 internal void for release line
280 glass article
310 glass material
312 first main surface
314 second main surface
316 to 319 four end faces
320 separation line
330 product line
340 release line
380 glass article

What is claimed is:

1. A glass plate having a first main surface and a second main surface opposite each other,
   a plurality of separation lines being formed in the glass plate and on the first main surface by irradiating the glass plate with laser light,
   the separation lines being configured of at least one product line and at least one release line; the product line corresponding to an outline of a glass article to be separated and extracted from the glass plate; and the release line being a part of the separation lines other than the product line,
   the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line,
   a maximum distance $P_{1max}$ between centers of the in-plane voids adjacent to each other arranged on the first main surface falling within a range of 1 $\mu$m to 10 $\mu$m,
   the release line including a plurality of internal void arrays for release line, each of the internal void arrays for release line being arranged along a line connecting the first main surface and the second main surface; and the internal void array for release line being configured of a plurality of internal voids for release line, and
   a maximum distance $P_{2max}$ between centers of virtual in-plane voids adjacent to each other being greater than 10 $\mu$m, the virtual in-plane void being defined to be a position at which an extension line extended from the internal void array for release line crosses the first main surface, or a void in the internal void array for release line on the first main surface when the void is located on the first main surface.

2. The glass plate according to claim 1,
   wherein the maximum distance $P_{2max}$ falls within a range of 13 $\mu$m to 20 $\mu$m.

3. The glass plate according to claim 1,
   wherein at least one of the internal void arrays for release line has an in-plane void on the first main surface.

4. The glass plate according to claim 3,
   wherein at least one of the internal void arrays for release line has an in-plane void on the first main surface and an in-plane void on the second main surface.

5. The glass plate according to claim 3,
   wherein the internal void arrays for release line include a first internal void array for release line, a second internal void array for release line, and a third internal void array for release line, arranged along a predetermined direction in the first main surface in this order, and wherein the first internal void array for release line has an in-plane void on the first main surface and does not have an in-plane void on the second main surface; the second internal void array for release line does not have an in-plane void on the first main surface and has an in-plane void on the second main surface; and the third internal void array for release line has an in-plane void on the first main surface and does not have an in-plane void on the second main surface.

6. The glass plate according to claim 1,
wherein the release line includes a second in-plane void array on the first main surface, and
wherein the internal void arrays for release line have in-plane voids on the first main surface, the in-plane voids of the internal void arrays configuring the second in-plane void array.

7. The glass plate according to claim 6,
wherein the in-plane voids configuring the second in-plane void array are arranged at substantially equal intervals on the first main surface.

8. The glass plate according to claim 6,
wherein at least one of the internal void arrays for release line does not penetrate the second main surface.

9. The glass plate according to claim 1,
wherein a number of the internal voids for release line configuring at least one of the internal void arrays for release line is less than or equal to a number of internal voids for product line configuring the internal void array for product line.

10. The glass plate according to claim 1,
wherein the in-plane voids configuring the first in-plane void array are arranged at substantially equal intervals on the first main surface.

11. The glass plate according to claim 1,
wherein each of the internal void arrays for product line has an in-plane void on the second main surface.

12. The glass plate according to claim 1,
wherein the separation lines include a curved part or are substantially configured of straight lines.

13. The glass plate according to claim 1,
wherein the glass plate is chemically tempered.

14. A manufacturing method of a glass plate comprising:
preparing a glass material having a first main surface and a second main surface opposite each other; and
irradiating the glass material with laser light to form separation lines,
the separation lines being configured of at least one product line and at least one release line; the product line corresponding to an outline of a glass article to be separated and extracted from the glass material; and the release line being a part of the separation lines other than the product line,
the product line including a first in-plane void array configured of a plurality of in-plane voids arranged on the first main surface; the product line further including a plurality of internal void arrays for product line, each having an in-plane void of the first in-plane void array, and extending from the first main surface toward the second main surface; and the internal void array for product line being configured of a plurality of internal voids for product line,
a maximum distance $P_{1max}$ between centers of the in-plane voids adjacent to each other arranged on the first main surface falling within a range of 1 μm to 10 μm,
the release line including a plurality of internal void arrays for release line, each of the internal void arrays for release line being arranged along a line connecting the first main surface and the second main surface; and the internal void array for release line being configured of a plurality of internal voids for release line, and
a maximum distance $P_{2max}$ between centers of virtual in-plane voids adjacent to each other being greater than 10 μm, the virtual in-plane void being defined to be a position at which an extension line extended from the internal void array for release line crosses the first main surface, or a void in the internal void array for release line on the first main surface when the void is located on the first main surface.

15. The manufacturing method of a glass plate according to claim 14,
wherein the maximum distance $P_{2max}$ falls within a range of 13 μm to 20 μm.

16. The manufacturing method of a glass plate according to claim 14 further comprising:
performing a chemical tempering process for the glass material after irradiating the glass material with laser light.

* * * * *